(12) United States Patent
Rutar

(10) Patent No.: US 11,914,408 B2
(45) Date of Patent: Feb. 27, 2024

(54) ACTIVE FLOW CONTROL SYSTEM

(71) Applicant: Hamilton Sundstrand Corporation, Charlotte, NC (US)

(72) Inventor: Matej Rutar, Manchester, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/581,673

(22) Filed: Jan. 21, 2022

(65) Prior Publication Data
US 2023/0236613 A1 Jul. 27, 2023

(51) Int. Cl.
*G05D 7/06* (2006.01)
*F02C 9/26* (2006.01)
*F02C 7/232* (2006.01)
*F16K 31/00* (2006.01)

(52) U.S. Cl.
CPC .......... *G05D 7/0664* (2013.01); *F02C 7/232* (2013.01); *F02C 9/26* (2013.01); *F16K 31/004* (2013.01)

(58) Field of Classification Search
CPC .............. G05D 7/0664; G05D 16/206; Y10T 137/7761; Y10T 137/87877; F16K 31/004; F02C 9/26; F02C 7/232
USPC ............................................... 137/487.5, 883
See application file for complete search history.

(56) References Cited

U.S. PATENT DOCUMENTS

| | | | |
|---|---|---|---|
| 4,842,017 A | 6/1989 | Reynolds | |
| 6,450,204 B2 * | 9/2002 | Itzhaky | F16K 31/005 137/883 |
| 6,918,379 B2 | 7/2005 | Reischl et al. | |
| 7,040,349 B2 * | 5/2006 | Moler | F16K 31/006 137/884 |
| 7,114,336 B2 | 10/2006 | Hommema | |
| 7,681,555 B2 | 3/2010 | Hargreaves et al. | |
| 7,775,052 B2 | 8/2010 | Cornwell et al. | |
| 8,387,900 B2 | 3/2013 | Reynolds et al. | |
| 8,739,544 B2 | 6/2014 | Rawlinson et al. | |
| 9,562,487 B2 | 2/2017 | Shaver et al. | |
| 10,302,056 B2 | 5/2019 | Salazar et al. | |
| 11,137,780 B1 * | 10/2021 | Doyle | E04H 4/12 |
| 2002/0002425 A1 * | 1/2002 | Dossey | G01F 1/44 700/282 |
| 2004/0206409 A1 * | 10/2004 | Yano | F16K 31/004 137/883 |
| 2004/0226507 A1 * | 11/2004 | Carpenter | G05D 7/0647 118/715 |

(Continued)

FOREIGN PATENT DOCUMENTS

EP 2236924 A2 10/2010
JP 2001249721 A 9/2001

OTHER PUBLICATIONS

Extended European Search Report issued in Applictaion No. 23152759.9 dated Oct. 10, 2023.

*Primary Examiner* — William M McCalister
(74) *Attorney, Agent, or Firm* — Locke Lord LLP; Joshua L. Jones; Gabriella D'Angelo

(57) ABSTRACT

In accordance with at least one aspect of this disclosure, a system for active flow control includes one or more flow control devices configured to control flow between a fluid source and a fluid destination, and a control module configured to control a flow area of each of the one or more flow control devices with fluid provided from the fluid source flowing to the fluid destination through the one or more flow control devices.

14 Claims, 1 Drawing Sheet

(56) References Cited

U.S. PATENT DOCUMENTS

| | | | |
|---|---|---|---|
| 2005/0016606 A1* | 1/2005 | Moler | F16K 27/003 |
| | | | 137/883 |
| 2006/0097644 A1* | 5/2006 | Kono | G05D 16/206 |
| | | | 315/111.21 |
| 2006/0132559 A1* | 6/2006 | Sueoka | B41J 2/175 |
| | | | 347/85 |
| 2007/0095413 A1* | 5/2007 | Zhu | F16K 27/003 |
| | | | 137/883 |
| 2009/0077945 A1 | 3/2009 | Cornwell et al. | |
| 2010/0030390 A1* | 2/2010 | Yamaguchi | G05D 7/0664 |
| | | | 700/285 |
| 2010/0043830 A1* | 2/2010 | Kitahara | G05D 7/0664 |
| | | | 134/36 |
| 2015/0053285 A1* | 2/2015 | Nakashima | G05D 7/0664 |
| | | | 137/565.11 |
| 2019/0138033 A1* | 5/2019 | Sawachi | H01J 37/32449 |

* cited by examiner

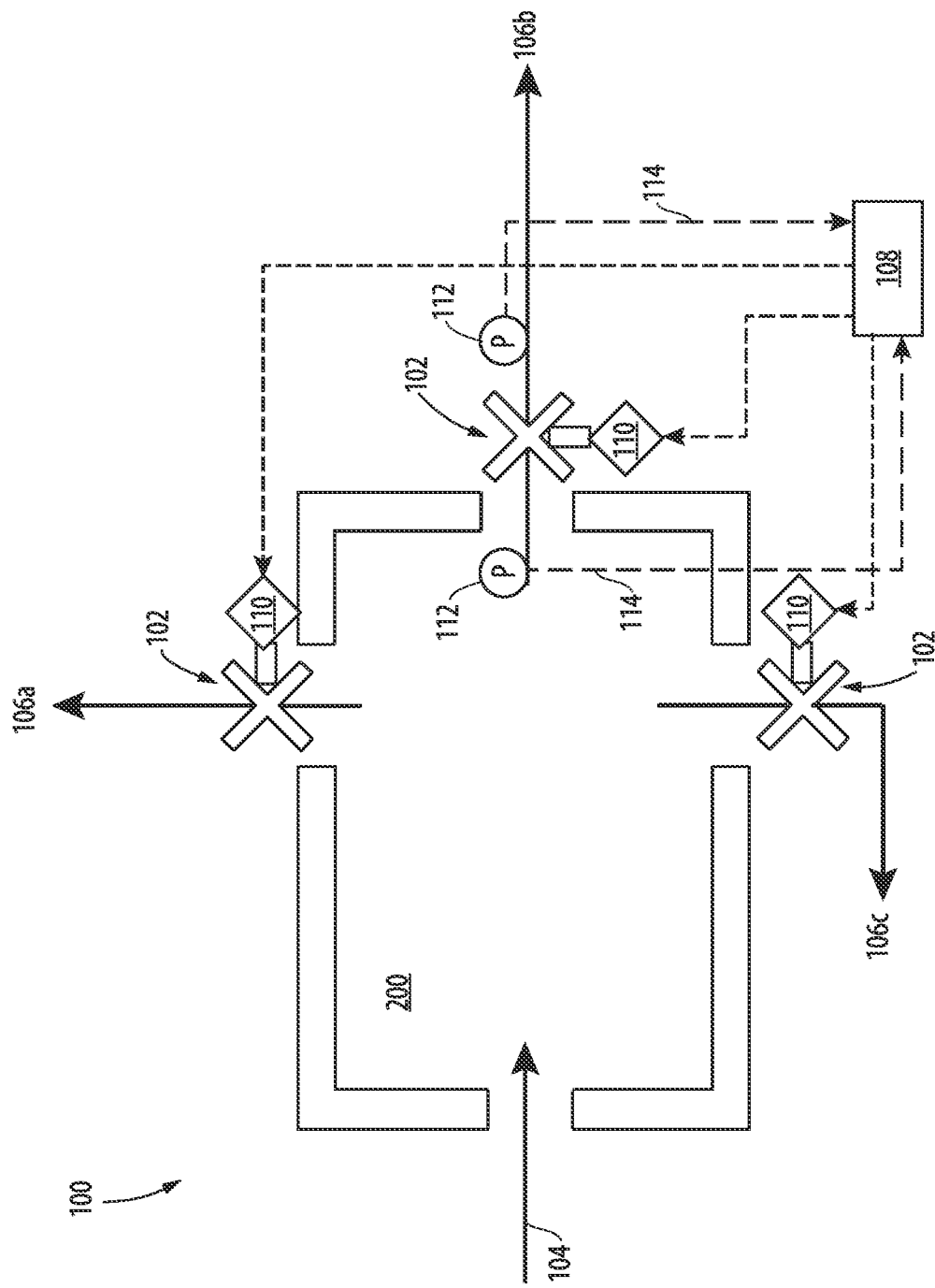

ACTIVE FLOW CONTROL SYSTEM

TECHNICAL FIELD

The present disclosure relates to flow control devices.

BACKGROUND

Engine fuel controllers typically include passive hydro-mechanical components, such as pressure regulating valves, minimum pressure valves, and the like. However, the design of these components may not be changed during operation, without shutting down an engine, for example. Active components used in engine fuel controllers can include electro-mechanical based devices like electro-hydraulic servo valves and solenoids, but such devices may not operate quickly enough to provide the desired response time.

There remains a need in the art for active control of flow control devices that offer faster response rates than conventional passive and active systems. This disclosure provides a solution for this need.

SUMMARY

In accordance with at least one aspect of this disclosure, a system for active flow control includes one or more flow control devices configured to control flow between a fluid source and a fluid destination, and a control module configured to control a flow area of each of the one or more flow control devices with fluid provided from the fluid source flowing to the fluid destination through the one or more flow control devices.

In embodiments, one or more actuators are operatively connected between the one or more flow control devices and the control module, wherein the control module is configured to control the flow area of the one or more flow control devices via the one or more actuators. In certain embodiments, the one or more actuators can include a piezoelectric actuator.

In certain embodiments, the fluid destination can include an actuation system. In certain embodiments, the fluid destination can include a combustor of an engine. In certain embodiments, the fluid destination can include a bypass return flow system. In embodiments, the one or more flow control devices can be included in a single interconnected fluid system, where the fluid destination includes one or more of an actuation system, a combustor of an engine, and/or a bypass return flow system, or any combination thereof.

In certain embodiments, one or more pressure sensors operatively connected upstream and/or downstream of the one or more flow control devices configured to sense and output a pressure signal indicative of a pressure in the flow system upstream and/or downstream of the one or more flow control devices. In certain such embodiments, the control module can be configured to control the one or more flow control devices based at least in part on the signal indicative of a pressure in the flow system upstream and/or downstream of the one or more flow control devices.

In accordance with at least one aspect of this disclosure, a control module for active flow control can include computer readable instructions configured to cause the control module to control one or more actuators operatively connected to one or more flow control devices to adjust a flow area of the one or more flow control devices while fluid is provided from a fluid source to a fluid destination through the one or more flow control devices.

In embodiments, the computer readable instructions can be configured to cause the control module to control the one or more actuators without stopping flow through the one or more flow control devices. In embodiments, the one or more actuators can include a piezoelectric actuator.

In certain embodiments, the control module can be configured to receive one or more signals indicative of a pressure in the flow system upstream and/or downstream of the one or more flow control devices from one or more pressure sensors operatively connected upstream and/or downstream of the one or more flow control devices. In certain such embodiments, the computer readable instructions can be configured to cause the control module to control the one or more flow control devices based at least in part on the signal indicative of a pressure in the flow system upstream and/or downstream of the one or more flow control devices.

In accordance with at least one aspect of this disclosure, a method can include controlling one or more actuators operatively connected to one or more flow control devices to adjust a flow area of the one or more flow control devices while fluid is provided from a fluid source to a fluid destination through the one or more flow control devices. In embodiments, controlling can include, controlling the one or more actuators without stopping flow through the one or more flow control devices.

In certain embodiments, the method can include, sensing a pressure upstream and/or downstream of the one or more flow control devices from one or more pressure sensors operatively connected upstream and/or downstream of the one or more flow control devices. In certain such embodiments, controlling can further include, controlling the one or more flow control devices based at least in part on the signal indicative of a pressure upstream and/or downstream of the one or more flow control devices.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a schematic diagram of a flow control system in accordance with this disclosure, showing one or more flow control devices disposed in the flow control system.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100.

In accordance with at least one aspect of this disclosure, a system 100 for active flow control can include one or more flow control devices 102 configured to control flow between a fluid source 104 and a fluid destination 106. A control module 108 can be configured to control a flow area of each of the one or more flow control devices 102 with fluid provided from the fluid source 104 flowing to the fluid destination 106 through the one or more flow control devices 102. More specifically, the control module 108 can be configured to control the one or more flow control devices 102 while fluid is flowing through the one or more flow control devices 102, and without stopping said fluid flow.

In embodiments, one or more actuators 110 are operatively connected between the one or more flow control devices 102 and the control module 108, where the control module 108 is configured to control the flow area of the one or more flow control devices 102 via the one or more actuators 110. In certain embodiments, the one or more actuators 110 can include a piezoelectric actuator.

In certain embodiments, the fluid destination 106 can include an actuation system 106a. In certain embodiments, the fluid destination 106 can include a combustor of an engine 106b. In certain embodiments, the fluid destination can include a bypass return flow system 106c. In embodiments, the one or more flow control devices 102 can be included in a single interconnected fluid system 200 (e.g., as shown), where the fluid destination 106 includes one or more of an actuation system 106a, a combustor of an engine 106b, and/or a bypass return flow system 106c, or any combination thereof.

In certain embodiments, one or more pressure sensors 112 can be operatively connected upstream and/or downstream of the one or more flow control devices 102 configured to sense and output a pressure signal 114 indicative of a pressure in the flow system 200 upstream and/or downstream of the one or more flow control devices 102. In certain such embodiments, the control module 108 can be configured to control the one or more flow control devices 102 based at least in part on the signal 114 indicative of a pressure in the flow system 200 upstream and/or downstream of the one or more flow control devices 102.

In accordance with at least one aspect of this disclosure, a control module (e.g., module 108) for active flow control can include computer readable instructions configured to cause the control module to control one or more actuators (e.g., actuators 110) operatively connected to one or more flow control devices (e.g., devices 102) to adjust a flow area of the one or more flow control devices while fluid is provided from a fluid source 104 to a fluid destination 106 through the one or more flow control devices.

In embodiments, the computer readable instructions can be configured to cause the control module to control the one or more actuators without stopping flow through the one or more flow control devices (e.g., without shutting down a pump or the flow system 200). In embodiments, the one or more actuators can include a piezoelectric actuator.

In certain embodiments, the control module 108 can be configured to receive one or more signals 114 indicative of a pressure in the flow system upstream and/or downstream of the one or more flow control devices from one or more pressure sensors operatively connected upstream and/or downstream of the one or more flow control devices 102. Accordingly, the computer readable instructions can be configured to cause the control module 108 to control the one or more flow control devices 102 based at least in part on the signal 114 indicative of a pressure in the flow system upstream and/or downstream of the one or more flow control devices.

In embodiments, the control module 108 and/or other components of system 100 can be or include both hard wired circuits that cause a logic (e.g. predictive) to be executed, and/or software-based components, for example, simple electric circuits employing analogue components, or the controller can include a CPU, a memory, machine readable instructions in the memory that when executed cause the CPU to perform a method or cause the control module 108 to perform a method, for example as described below. In embodiments, the control module 108 can utilize any suitable algorithm to control the controllable valve as provided herein. In embodiments, the algorithm could be constructed using the functionality as described above in addition to known general engineering principles as applied to the specific characteristics of each particular fuel system to which the technology of the present disclosure is applied.

In accordance with at least one aspect of this disclosure, a method can include controlling one or more actuators (e.g., actuators 110) operatively connected to one or more flow control devices (e.g., devices 102) to adjust a flow area of the one or more flow control devices while fluid is provided from a fluid source to a fluid destination through the one or more flow control devices. In embodiments, controlling can include, controlling the one or more actuators without stopping flow through the one or more flow control devices (e.g., actively controlling the one or more flow control devices).

In certain embodiments, the method can include, sensing a pressure upstream and/or downstream of the one or more flow control devices from one or more pressure sensors (e.g., sensors 112) operatively connected upstream and/or downstream of the one or more flow control devices. In certain such embodiments, controlling can further include, controlling the one or more flow control devices based at least in part on the signal indicative of a pressure upstream and/or downstream of the one or more flow control devices.

Typical flow control devices are hydro-mechanical flow control devices, but in certain instances, such devices may be slow acting, and may not be able to provide active control.

Embodiments, however, include electrically controlled flow control devices, which can provide fast moving, active control. Embodiments can include sensors, such as pressure sensors, configured to send pressure readings to control system, where the control system can then control the flow control devices based on the pressure readings. Embodiments can include additional sensors or, if desired for certain applications, traditional valving could be incorporated to work in conjunction with the actively controlled valves.

In embodiments a fluid destination can include a combustor of an engine, where a metering valve can be included between a fluid source and the combustor. Having an active controlled flow control device as provided herein could replace, or improve the existing metering valve. The same or similarly can be true if the fluid destination includes an actuation system or bypass line. For example, active controlled flow control device as provided herein could replace, or improve the existing bypass valves or pressure regulating valves. Because the flow control devices are actively controlled, less internal components may be needed.

Embodiments can utilize piezoelectric actuator devices, for example in an engine fuel control. Piezoelectric actuator devices can have high positional accuracy and very fast response times (e.g., milliseconds). The 'active' approach as disclosed herein can be implemented using advanced software control algorithms in an engine fuel control control module, which can have superior performance over current designs. Advanced control software, including model predictive, multi-variable, and the like, can be used and updated to enhance performance. Software control, as disclosed herein, can allow for easier changes to operation than hardware. Moreover, advanced control algorithms could be incorporated through software updates to keep improving performance, without requiring changes to hardware.

Embodiments can include fast acting flow control devices which can serve to replace traditional valves (e.g., hydromechanical valves). Piezoelectric devices have high positional accuracy and millisecond response rates, faster than mechanical valves.

Embodiments can improve dynamic performance, such as combustor fuel flow bandwidth or actuator disturbance rejection, and can reduce complexity and weight of fuel control systems.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave.

Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A system for active flow control, comprising:
   one or more flow control devices configured to control flow between a fluid source and a plurality of fluid destinations, wherein the plurality of fluid destinations includes:
   an actuation system connected downstream of the fluid source by a first one of the one or more flow control devices;
   a combustor of an engine connected downstream of the fluid source by a second one of the one or more flow control devices; and
   a bypass return flow system connected downstream of the fluid source by a third one of the one or more flow control devices; and
   a control module configured to control a flow area of each of the one or more flow control devices with fluid provided from the fluid source flowing to the actuation system through the first one of the one or more flow control devices, to the combustor through the second one of the one or more flow control devices, and to the bypass return flow system through the third one of the one or more flow control devices.

2. The system of claim 1, further comprising one or more actuators operatively connected between the one or more flow control devices and the control module, wherein the control module is configured to control the flow area of the one or more flow control devices via the one or more actuators.

3. The system of claim 2, wherein the one or more actuators includes a piezoelectric actuator.

4. The system of claim 1, further comprising one or more pressure sensors operatively connected upstream and/or downstream of the one or more flow control devices configured to sense and output a pressure signal indicative of a pressure in the flow system upstream and/or downstream of the one or more flow control devices.

5. The system of claim 4, wherein the control module is configured to control the one or more flow control devices based at least in part on the signal indicative of a pressure in the flow system upstream and/or downstream of the one or more flow control devices.

6. A system for active flow control, comprising:
   a plurality of fluid destinations that include:
   an actuation system connected downstream of a fluid source by a first flow control device;
   a combustor of an engine connected downstream of the fluid source by a second flow control device; and
   a bypass return flow system connected downstream of the fluid source by a third flow control device;
   computer readable instructions configured to cause a control module to control actuators operatively connected to the flow control devices to adjust flow areas of the flow control devices while fluid is provided from the fluid source to the fluid destinations through the flow control devices,
   wherein the computer readable instructions are configured to cause the control module to control the flow area of the flow control device with fluid provided from the fluid source flowing to the actuation system through the first flow control device, to the combustor through the second flow control device, and to the bypass return flow system through the third flow control device.

7. The system of claim 6, wherein the computer readable instructions are configured to cause the control module to control the one or more actuators without stopping flow through the one or more flow control devices.

8. The system of claim 6, wherein the one or more actuators includes a piezoelectric actuator.

9. The system of claim 6, wherein the control module is configured to receive one or more signals indicative of a pressure upstream and/or downstream of the one or more flow control devices from one or more pressure sensors operatively connected upstream and/or downstream of the one or more flow control devices.

10. The system of claim 9, wherein the computer readable instructions are configured to cause the control module to control the one or more flow control devices based at least in part on the signal indicative of a pressure upstream and/or downstream of the one or more flow control devices.

11. A method, comprising:
    controlling one or more actuators operatively connected to one or more flow control devices to adjust a flow area of the one or more flow control devices while fluid is provided from a fluid source to a plurality of fluid destinations through the one or more flow control devices, wherein the plurality of fluid destinations includes:
    an actuation system connected downstream of the fluid source by a first one of the one or more flow control devices;

a combustor of an engine connected downstream of the fluid source by a second one of the one or more flow control devices; and a bypass return flow system connected downstream of the fluid source by a third one of the one or more flow control devices, wherein adjusting flow area of the one or more flow control devices includes controlling a flow area of each of the one or more flow control devices with fluid provided from the fluid source flowing to the actuation system through the first one of the one or more flow control devices, to the combustor through the second one of the one or more flow control devices, and to the bypass return flow system through the third one of the one or more flow control devices.

12. The method of claim 11, wherein controlling includes, controlling the one or more actuators without stopping flow through the one or more flow control devices.

13. The method of claim 11, further comprising, sensing a pressure upstream and/or downstream of the one or more flow control devices from one or more pressure sensors operatively connected upstream and/or downstream of the one or more flow control devices.

14. The method of claim 13, wherein controlling further includes, controlling the one or more flow control devices based at least in part on the signal indicative of a pressure upstream and/or downstream of the one or more flow control devices.

* * * * *